United States Patent [19]
Käbisch et al.

[11] 3,952,089
[45] Apr. 20, 1976

[54] PROCESS FOR THE CONCENTRATION OF HYDROGEN PEROXIDE

[75] Inventors: Gerhard Käbisch; Rudolf Trübe, both of Rheinfelden, Germany

[73] Assignee: Deutsche Gold- und Silber-Scheideanstalt vormals Roessler, Germany

[22] Filed: May 1, 1972

[21] Appl. No.: 249,009

[30] Foreign Application Priority Data
May 21, 1971 Germany............................ 2125192

[52] U.S. Cl. ................................................ 423/588
[51] Int. Cl.² ....................................... C01B 15/02
[58] Field of Search ............. 23/207; 423/587, 588, 423/589, 590; 260/369

[56] References Cited
UNITED STATES PATENTS

| | | | |
|---|---|---|---|
| 3,010,808 | 11/1961 | Holmes et al. | 423/587 |
| 3,041,143 | 6/1962 | Dawsey | 423/589 |
| 3,714,342 | 1/1973 | Käbisch | 423/589 |

FOREIGN PATENTS OR APPLICATIONS

| | | | |
|---|---|---|---|
| 1,261,838 | 2/1968 | Germany | 23/207 |

Primary Examiner—Oscar R. Vertiz
Assistant Examiner—Wayne A. Langel
Attorney, Agent, or Firm—Cushman, Darby & Cushman

[57] ABSTRACT

Hydrogen peroxide solution is produced by the anthraquinone process as a crude extraction product of over 50% $H_2O_2$, using working solutions having (1) as the reaction carrier quinone derivatives having a molecular weight below 275, (2) $H_2O_2$ capacities below 15 grams $H_2O_2$/liter of working solution, and (3) distribution coefficients of over 30, preferably over 40. The crude $H_2O_2$ extract is water stripped to above 80% concentration and then concentrated to above 90% by freezing.

10 Claims, No Drawings

PROCESS FOR THE CONCENTRATION OF HYDROGEN PEROXIDE

The present invention is an improvement on the process for the production of hydrogen peroxide by the anthraquinone process described in Käbisch and Wittmann application Ser. No. 69,152 filed Sept. 2, 1970, now abandoned (corresponding to German application P 1945753.5 of Sept. 10, 1969). In the Käbisch et al patent there is described the production of hydrogen peroxide in a concentration of above 50 weight % and a carbon content below 300 mg carbon/liter. In the extraction step of the cyclic anthraquinone process there is obtained a crude aqueous extract containing 55 to 75 weight % of hydrogen peroxide by the energy saving process of water stripping. It has subsequently been found that the water stripping is preferably carried out to a hydrogen peroxide concentration of 65–80 weight %.

For convenience the primary features of the Käbisch et al application are set forth below.

As stated in the Kabisch et al application there are produced crude extraction products with over 35% and preferably with 40–55% of $H_2O_2$ with carbon contents which corresponds to the C value of customary $H_2O_2$ distillates if working solutions are employed which a. contain as reaction carriers quinone derivatives containing a molecular weight below 275;

b. have a $H_2O_2$ capacity below a value of 15 grams of $H_2O_2$ per liter, preferably below 13 grams of $H_2O_2$ per liter and which can be as low as 7 grams/liter, and which c. have distribution coefficients $$DC = \frac{\text{weight \% } H_2O_2 \text{ in the aqueous phase}}{\text{weight \% } H_2O_2 \text{ in the organic phase}}$$

with values over 30, preferably over 40.

Preferably according to the Kabisch et al application there are used working solutions with quinone derivatives such as, for example 2-ethyl anthraquinone or t-butyl anthraquinone showing a high stability under recycling conditions and which are easily and inexpensively produced. Likewise, mixtures of the above-mentioned reaction carriers can be used as well as mixtures with the corresponding tetrahydro derivatives. Also there can be used alkyl anthraquinones such as 2-ethyl anthraquinone, 2-butyl anthraquinone, 2-isopropyl anthraquinone, 2-sec-butyl anthraquinone, 1,3-diethyl anthraquinone, 2,3-diethyl anthraquinone, 1,4-diethyl anthraquinone, 2,7-diethyl anthraquinone and partially nuclear hydrogenated derivatives thereof such as 2-ethyl tetrahydroanthraquinone and 2-butyl tetrahydroanthraquinone.

Especially suited for the production of a highly concentrated $H_2O_2$ crude extraction product are working solutions which, besides the named reaction carriers, contain as solvents aromatic hydrocarbons in the boiling range of about 150° – 220°C. at normal pressure and organic phosphates or phosphonates.

As aromatic hydrocarbons especially suitable are the benzene derivatives recovered by catalytic aromatization process out of aliphatic compounds such as trimethyl benzenes, ethyl methyl benzenes, tetramethyl benzenes or specific compounds such as t-butyl benzene or t-butyl toluene. Also, but less preferably, there can be used ethyl propyl benzene, 1,3-diethyl benzene, 1,4-diethyl benzene, isodurene, xylene, toluene, etc.

As organic phosphate esters or phosphonate esters especially suited are esters of aliphatic (alkyl) alcohols containing about 5 to 9 carbon atoms. Examples of such phosphates and phosphonates include trioctyl phosphate, triamyl phosphate, tri 2-ethylhexyl phosphate, diphenyl butyl phosphate, tributyl phosphate, triisobutyl phosphate, diphenyl octyl phosphate, diphenyl cresyl phosphate, tricresyl phosphate, butyl diisoamyl phosphate, triisoamyl phosphate, tri nonyl phosphate, tris decyl phosphate, dibutyl butane phosphonate, diethyl pentane phosphonate, dibutyl pentane phosphonate, diethyl hexane phosphonate, dibutyl hexane phosphonate, diethyl heptane phosphonate, dibutyl heptane phosphonate, dibutyl octane phosphonate, dibutyl decane phosphonate, dioctyl octane phosphonate.

For the production of highly concentrated crude extraction products according to the Käbisch et al application, it is essential that such working solutions possess high distribution coefficients. They have furthermore the advantage of small water or $H_2O_2$ solubility besides a good chemical stability so that the crude extraction product produced in permanent recycling of the working solution also shows a relatively small carbon value. Beyond that it has found unexpectedly that the carbon content in a crude product produced according to the Kabisch et al application is practically independent of the adjustment of the $H_2O_2$ concentration in the crude extraction product as can be seen from Table 1.

Table 1

C Content in $H_2O_2$ — Crude Extraction Product at Various Concentrations (the $H_2O_2$ was produced with a 2 year old working solution according to German Patent 1,261,838).

| | | | | |
|---|---|---|---|---|
| Weight % in crude extraction product | 10.3 | 25.0 | 37.2 | 49.7 |
| C-content in crude extraction product (mg. C/l) | 176 | 182 | 179 | 180 |

The result, equal carbon content in the crude extraction products of different concentration, was not expected since according to previous conceptions there was attributed to $H_2O_2$ a higher dissolving power for organic compounds than water. In reverse it is also known that $H_2O_2$ dissolves better than water in organic compounds as can be seen from Table 2 in which the same working solution as that employed in the experiments reproduced in Table 1 was again used.

Table 2

Solubility of Water and $H_2O_2$ in Working Solution

| | Concentration | 20°C | 30°C | 40°C | 50°C |
|---|---|---|---|---|---|
| Solubility of 98% $H_2O_2$ in a working solution made by German patent 1,261,838 | g/l | 14.4 | 15.4 | 16.5 | 17.5 |
| Solubility of water in a working solution made by German patent 1,261,838 | g/l | 2.3 | 2.6 | 2.9 | 3.4 |

The results in Table 1 show that with the working solution in the extraction step there can be recovered a 25% $H_2O_2$ crude product with a carbon value of 182 mg. C/l. or that a $H_2O_2$ crude product of the same concentration but with half as much carbon content is producible, if a 50% crude product according to the invention is diluted to a concentration of 25%.

There cannot be obtained with the process of the Käbisch et al application the production of a $H_2O_2$ extraction product of any desired height of $H_2O_2$ concentration. The limiting value of the maximum attainable concentration is due to the distribution coefficient in correlation with the capacity of the working solution. For example, if the $H_2O_2$ capacity in the working solution is 1.4 weight % and the distribution coefficient (DC) has a value of 38, then theoretically there can be obtained in the aqueous phase a maximum $H_2O_2$ concentration of 1.4 × 38 = 53.2 weight %. If the $H_2O_2$ capacity of the working solution is 0.9 weight % at a DC value of 67, then there can be theoretically obtained a $H_2O_2$ maximum concentration of 0.9 × 67 = 60.3 weight %.

The $H_2O_2$ concentration producible with reasonably economical extraction expense is between about 3–10 weight % below the maximum attainable concentration.

A further boundary on the height of the $H_2O_2$ concentration is maintaining the necessary boundaries on safety. This is of concern for the two-phase system always present in the extraction step. Only after considering the safety factor can the highest permissible boundary on the concentration of the crude extraction product be fixed. This, in most cases, is under a $H_2O_2$ content of 60 weight %. Preferably the concentration in the crude product is 40 to 55% according to the Kabisch et al application.

The customary $H_2O_2$ concentration in the commercial product recovered by distillation is 60–75% $H_2O_2$. In an improved form of carrying out the process of the Käbisch et al application it has been surprisingly proven that one can safely concentrate the extraction product to the customary commercial $H_2O_2$ concentration by the industrially simple and energy saving process of water topping off (water stripping) as set forth in Käbisch application Ser. No. 68,977 filed on Sept. 2, 1970 and corresponding to German Pat. No. P 1945754.6 and thereby obtain products which are not distinguishable from commercial products recovered by an expensive distillation. The results of comparison analyses are set forth in Table 3.

Table 3

Comparison of $H_2O_2$ Quality

| | Customary Commercial $H_2O_2O$ Distillates | | | Extraction Product of the Invention | topped off Crude Extraction Product of the Application |
|---|---|---|---|---|---|
| Test | 1 | 2 | 3 | 4 | 5 |
| $H_2O_2$ concentration (Weight %) | 70.6 | 70.4 | 71.9 | 47.2 | 69.1 |
| Color value (Fe $Cl_3$Scale) | 1 | 0 | 1 | 1 | 1 |
| C content (mg.C/l) | 330 | 250 | 83 | 162 | 183 |
| pH value (electometrically) | 1.8 | 0.1 | 2.0 | 2.2 | 1.3 |
| Vaporization residue (mg./l) | 183 | 205 | 124 | 107 | 120 |
| Residue on ignition (mg/l) | 47 | 82 | 95 | 45 | 65 |

From the values set forth in Table 3 and further determinations, the results of which are not set forth in the table, it can be seen that the topped off product of the Käbisch et al application Ser. No. 69,152 produced with comparably less economic and industrial expense, is at least equal to the expensive $H_2O_2$ distillate, if not even superior in much of the data.

Surprisingly, the C content in the water stripped $H_2O_2$ is very low since during the concentration of the $H_2O_2$ by water topping off with a concentration, for example, from 47.2 weight % (C content 162 mg/l) to a concentration of 69.1 weight % (C content 183 mg/l) a large part of the organic impurities, namely the so-called "volatile carbon" is removed with the topped off water.

If in the concentration of the crude extraction product by water topping off, the C content in the concentrated $H_2O_2$ is stepwise dependent on the $H_2O_2$ concentration, the result is that the C content first is taken away at increasing $H_2O_2$ concentration in the sump until the main amount of the volatile organic compounds is removed and afterwards is again taken up in the composition as the $H_2O_2$ concentration progresses. The phenomenon is true for all working solutions employed in production plants today which contain as reaction carriers alkyl anthraquinones having a molecular weight below 275. Examples of this type of working solution compositions are contained in Table 4.

Table 4

Examples of Industrial Usable Working Solutions For The Production of $H_2O_2$ Crude Extraction Products in Concentration of 35 – 60%

| Reaction Carrier | Quinone Dissolver | Hydroquinone Dissolver |
|---|---|---|
| 2-ethyl anthraquinone* | aromatic hydrocarbon | tri 2-ethyl-hexyl phosphate |
| 2-ethyl anthraquinone | aromatic hydrocarbon | methyl cyclohexanol acetate |
| 2-ethyl anthraquinone | t-butyl benzene | tri-n-amyl phosphate |
| t-butyl anthraquinone* | tetramethyl benzene | tri 2-ethyl hexyl phosphate |
| t-butyl anthraquinone | t-butyl benzene | tri n-amyl phosphate |

*or the tetrahydro derivative

For industrially carrying out the extraction step in the cyclic process of the anthraquinone process, there are suited the usual extraction machines and extraction columns in the art. Thus there can be used perforated plate columns and/or spray columns.

The crude $H_2O_2$ of over 35 weight % concentration of the extraction apparatus can in a given case be after treated with the customary methods in the anthraquinone process (for example, washing with organic solvents, treatment with adsorption agents).

The industrial carrying out of the concentration of the $H_2O_2$ extraction product according to the Käbisch et al application Ser. No. 69152 by topping off the water is a simple operation which can take place batchwise or continuously. It is preferred to work at reduced pressure, especially between 50 and 90 Torr. In a given case in order to avoid decomposition, the hydrogen peroxide can be stabilized by addition of a stabilizer to the system which can be introduced by feeding into the water for extraction or during the extraction or during the concentration.

Unless otherwise indicated, all parts and percentages are by weight.

The process of the Käbisch et al application Ser. No. 69,152 is further illustrated by examples 1 and 2.

EXAMPLE 1

In a technical apparatus there was recycled a working solution through the process steps hydrogenation, filtration, oxidation and extraction. The working solution had a composition analogous to that of German Pat. No. 1,261,838. The solvent consisted of 25 parts by volume trioctyl phosphate and 75 parts by volume of a technical alkylbenzene having a boiling range of 160° to 185°C. In the solution there were dissolved 125 grams of 2-ethyl anthraquinone. The flow of the working solution amounted to 500 liters per hour. The $H_2O_2$ content in the working solution after the oxidation step using 10% excess air as the oxidizing gas amounted to 1.0 weight % on the average. The extraction steps were carried out in two spray columns, each 100 millimeters in diameter and 9 meters long. Each of the columns had on their bottom as a distributor a perforated plate with a free cross section of 4.2%. In the extraction column there were fed hourly 4.75 liters of water. There arose $H_2O_2$ in an amount of 7.8 liters (density 1,194 at 15°C.) whose concentration on the average amounted to 50 weight %. The amount of $H_2O_2$ obtained corresponded to an extraction yield of 98%. The temperature in the hydrogenation step was 43°C. and the catalyst was palladium.

The 50% $H_2O_2$ had a carbon content of 187 mg C/liter. After passage through a 4 meter long washing column, 50 mm in diameter, filled with aromatic hydrocarbon (boiling range 160° – 185°C), the carbon value in the 50% $H_2O_2$ was lowered to 162 mg C/l.

EXAMPLE 2

(Concentration)

In a plant there were fed hourly 192 liters of a 50% hydrogen peroxide solution in the middle of a 6 meter long column, 0.5 m in diameter (packed with Raschig rings), which was connected at the bottom with a re-boiler (heating surface about 2 square meters), which was heated with 1.2 atmospheres absolute steam. There was drawn off hourly:

| | |
|---|---|
| from the column bottom (70% concentration) | 126 liters of $H_2O_2$ |
| from the top of the column (traces of $H_2O_2$) | 66 liters of water |

The concentration was carried out in a vacuum (63 Torr). The 70% concentrate corresponded qualitatively to the analytic values recorded in Table 3, column 5.

If the "$H_2O_2$ concentration" is carried out in the present invention in the manner of the Käbisch et al application Ser. No. 69152 by using water stripping to obtain a concentration beyond the 65–80 weight % range, the limit of carbon impurities of 300 mg C/l, mentioned in that application, can be exceeded. However, it is also known that hydrogen peroxide with increasing carbon content, increasing concentration and increasing temperature is increasingly difficult to handle, i.e. the $H_2O_2$ concentration according to the Käbisch et al application cannot be continued to be increased on an industrial scale without further consideration. Especially for reasons of industrial safety a hydrogen peroxide concentration of 90% should not be exceeded in water stripping.

It has been known for a long time to increase the $H_2O_2$ concentration to higher than 90% by a freezing out process (Schumb, Satterfield and Wentworth, Hydrogen Peroxide, New York-London 1955, pages 210-216).

In the process of concentration by freezing simultaneously the purity of the hydrogen peroxide is improved (German Pat. No. 1,041,479). The knowledge is not new that the freezing operation according to the known $H_2O/H_2O_2$ melt diagram practically produces a recrystallization and this is combined with a certain purification effect.

Although the concentration of $H_2O_2$ by freezing has been known for a long time, only a very small part of the total product of hydrogen peroxide is produced in the form of the over 90% product.

This is explained by the fact that the starting material for the production of the $H_2O_2$ concentrate with a content of above 90% was always added as an $H_2O_2$ distillate. If a high purity over 90% product were to be recovered, frequently there was used even a twice totally distilled $H_2O_2$ as the starting material. As a high purity product there is meant a manufacture which in the U.S.A. usually corresponds to "Food Grade Quality" (based on a 30% concentration the carbon content should be below 20 mg C/l). It is understandable that consequently the freezing operation as such was not contrary to a recovery of over 90% $H_2O_2$ on a broad basis, but instead the problem was the economically unfavorable production of the necessary starting material for this purpose. Were this obstacle removed, many possible starting materials for an over 90% product could be employed as a result of which the cost of transportation also could be reduced.

It has now been found that employing the procedure of the Käbisch et al application 69152, the stripping concentrate resulting from that process can be used for the simple and safe production of an over 90% $H_2O_2$ if the crude extraction product first is water stripped to a strength above 80% but below 90% and then is brought to a concentration above 90%, preferably to above 95% by a freezing out operation, e.g. at a temperature of about −15°C to −55°C, preferably −30° to −50°C. Surprisingly there are then obtained in the freezing out operation products which correspond to a Food Grade Quality. This result could not be expected since one skilled in the art would have considered it only possible to attain the high purity grade if the starting material itself showed high quality attainable only by twice distilling, or by a combination of an adsorptive purification step and a subsequent distillation step.

The process of the invention consequently consists of first recovering as highly concentrated $H_2O_2$ crude extraction product as can be attained in the cyclic anthraquinone process by the energy saving procedure of water stripping, i.e. a concentration of above 80%, preferably between 83 and 90 weight %, and then separating the concentrate into two fractions in a freezing out apparatus.

The product fraction P contains the high purity $H_2O_2$ in a concentration of above 90%, preferably above 95% and in a Food Grade Quality. The mother liquor fraction M contains the impurities coming from the starting material nearly completely dissolved and should have an $H_2O_2$ concentration of below 80%, preferably between 65 and 75%. The $H_2O_2$ depleted mother liquor can be further used directly in processes which do not have high requirements as to product purity. According to a preferred form of the invention, however, the mother liquor or a part of it first is depleted by known processes in the amount of impurity and then again returned to the stripping step. The advantage of this reduction in the impurities according to the present process results from the following considerations.

The freezing out operation economically is carried out especially favorably if the mother liquor fraction is quantitatively small in proportion to the fraction of highly pure hydrogen peroxide (see example 4). However, the mother liquor fraction then exhibits not only a small $H_2O_2$ content (which is favorable to the safety of the purification operation) but also contains the impurities in a nearly completely dissolved state. While it is now very difficult to free a very impure $H_2O_2$, such as the mother liquor produced, quantitatively from the impurities, it is surprisingly easily possible at slight expense to remove at least the greater part of the impurities. In a more preferred manner the impurities should only be impoverished in the mother liquor to the extent that their amount is equal to or less than in a stripping concentrate of equal $H_2O_2$ content (see example 5). Then the purified mother liquor can be returned again to the concentration step (according to example 3). If the mother liquor according to the described form of the invention is returned to the cycle, after previous purification, the process of the invention produces as the single end product high purity over 90% $H_2O_2$. The carbon content of the thus concentrated product is not over 150 mg/l preferably not over 80 mg/l, and can be as low as 5 mg/l. In contrast the starting crude extract may have a carbon content of 80 to 300 mg/l.

To deplete the mother liquor of impurities, there can be used known methods such as purification with adsorption agents (alumina, activated carbon, silica gel);

purification with ion exchangers (e.g. cation exchangers such as sulfonated styrene-divinyl benzene or anion exchangers such as quaternized chloromethylated styrene-divinyl, e.g. where the quaternizing groups are methyl as in Amberlite IRA-400);

Purification with high molecular weight materials (e.g. polyethylene or polypropylene);

Purification by flocculation (e.g. with flocculation agents such as aluminum hydroxide);

Purification in the so-called stripper-enricher, etc.

According to the process of the invention surprisingly there results a product of the highest concentration and purity without an $H_2O_2$ distillation step. In the preferred form there results an especially economical method of operation through which no complete purification must be undertaken but only a depletion of the impurities in the mother liquor from the freezing out operation before the mother liquor is returned again into the concentration step.

The process of the invention is further illustrated in the following examples. As previously stated, unless otherwise indicated, all parts and percentages are by weight.

EXAMPLE 3

Concentration of an $H_2O_2$ Extraction Product

In the cyclic anthraquinone there was recovered an $H_2O_2$ crude product whose characteristics are set forth in column 1 of following Table 5. The crude $H_2O_2$ product was produced in the manner set forth in example 1.

Table 5

|  | Dimension | 1<br>Crude extraction product | 2<br>Distilled concentrate | 3<br>Distilled concentrate |
|---|---|---|---|---|
| $H_2O_2$ content | weight % | 50 | 70 | 88 |
| Carbon | mg C/l | 171 | 178 | 239 |
| Stability | % decomposition after 15 hrs. at 95° C. | 0.7 | 0.6 | 0.8 |
| Color | according to FeCl$_3$ scale | 1 | 2 | 3 |
| Vaporization residue | mg/l | 111 | 125 | 169 |
| Residue on | mg/l | 43 | 67 | 90 |

Table 5-continued

| Dimension | 1<br>Crude extraction product | 2<br>Distilled concentrate | 3<br>Distilled concentrate |
| --- | --- | --- | --- |
| ignition | | | |

15 liters of the crude extraction product was concentrated to the extent that the sump had an $H_2O_2$ concentration of 88% in a 20 liter still equipped with a fractionaling column at a vacuum of 35 Torr by water stripping. During the concentration (by the procedure described in application Ser. No. 69,152) a sample was withdrawn and analyzed when the sump had an $H_2O_2$ concentration of 70%. The qualitative values of the 70% aqueous $H_2O_2$ product are given in column No. 2 and of the 88% product in column No. 3 or Table 5.

EXAMPLE 4

Fractionation of a Water Stripping Concentrate

There were flowed hourly into a 5 meter long fractionating column which was cooled to a temperature of −42°C. 485 grams (equal to 350 ml) of the stripping concentrate having an $H_2O_2$ content of 88% (Table 5, column No. 3). In the freezing out operation there accumulated the following two fractions:

Fraction P: 310 grams of a 99% $H_2O_2$ purest product at the bottom of the column;
Fraction M: 175 grams of a 68.3% $H_2O_2$ mother liquor at the head of the column.

From this there resulted an $H_2O_2$ distribution (per hour) according to the following balance:

In fraction P there are contained 307 grams of $H_2O_2$ (calculated as 100%)
In fraction M there are contained 119 grams of $H_2O_2$ (calculated as 100%)
The feed to the column contained 426 grams of $H_2O_2$ (calculated as 100%)

The qualitative values of the fractions are according to following Table 6.

Table 6

| | Dimension | Distilling Concentrate | Fraction P | Fraction M |
| --- | --- | --- | --- | --- |
| $H_2O_2$ content | weight % | 88 | 99 | 68.3 |
| Carbon | mg C/l | 239 | 36 | 563 |
| Stability | % decomposition after 15 hrs. at 95°C. | 0.8 | 0.1 | 1.3 |
| Color | according to $FeCl_3$ scale | 3 | 0–1 | 6 |
| Vaporization residue | mg/l | 169 | 38 | 375 |
| Residue on ignition | mg/l | 90 | 10 | 158 |

The quality values of fraction P are in part considerably below the limit of a Food Grade Quality product.

EXAMPLE 5

Purification of the $H_2O_2$ Mother Liquor

The mother liquor resulting in the fractionation in example 4 (Table 6, Fraction M) was led through a 60 cm. long column in an amount of 1.2 l/h. In the column there were 150 ml. of an ion exchange resin (a crosslinked polystyrene with a quaternary ammonium base, specifically a chloromethylated styrenedivinyl benzene polymer quaternized with trimethyl amine). The product was purified by running through the column at a column temperature of 20°C. The improvement in quality is shown in following Table 7.

Table 7

| | Dimension | 1<br>Before Purification | 2<br>After Purification |
| --- | --- | --- | --- |
| $H_2O_2$ content | weight % | 68.3 | 68.4 |
| Carbon | mg C/l | 563 | 181 |
| Stability | % decomposition after 15 hrs. at 95°C. | 1.3 | 0.3 |
| Color | $FeCl_3$ scale | 6 | 2 |
| Vaporization residue | mg/l | 375 | 111 |
| Residue on ignition | mg/l | 158 | 12 |

The values of the purified mother liquor consequently were practically the same as or better than the values of a water stripped concentrate with about the same $H_2O_2$ concentration (Compare Table 5, Column No. 2 with Table 3, Column No. 2).

Attention should always be paid to fulfilling this condition. In this case the purified mother liquor can be returned again to the concentration process according to example 3. If the purified mother liquor has a substantially poorer value than the stripping concentrate (at equal $H_2O_2$ content), then the purification process must be correspondingly intensified, for example by addition of larger amounts of ion exchangers or smaler through-put speeds.

What is claimed is:

1. A process of concentrating a crude $H_2O_2$ extraction product from an anthraquinone process consisting essentially of first water stripping the extraction product to a concentration of above 80% but below 90% and containing a carbon content of 80 to 300 mg/l, and then freezing the water stripped product to produce (1) a product having an $H_2O_2$ content above 90% and a carbon content of 80 mg/l or less and (2) a mother liquor depleted in $H_2O_2$.

2. The process according to claim 1 wherein the $H_2O_2$ content of the mother liquor (2) is reduced to below 80%.

3. The process according to claim 2 wherein the $H_2O_2$ content of the mother liquor (2) is reduced to between 65 and 75%.

4. The process according to claim 3 wherein the freezing is carried out until the $H_2O_2$ content of the product (1) is increased to above 95%.

5. The process according to claim 1 wherein the anthraquinone process is carried out using (a) as the reaction carrier an alkyl anthraquinones or alkyl tetrahydro anthraquinones having a molecular weight below 275, (b) a working solution having an $H_2O_2$ capacity below a value of 15 grams of $H_2O_2$ per liter and which (c) has a distribution coefficient above 30 and wherein the hydrogen peroxide concentration after extraction and before water stripping is above 35%.

6. The process according to claim 5 wherein the $H_2O_2$ concentration after extraction and before water stripping is 40 to 55%.

7. The process according to claim 1 wherein the freezing is carried out until the $H_2O_2$ content of the product (1) is increased to above 95%.

8. The process according to claim 1 wherein the concentration of the $H_2O_2$ after extraction and before water stripping is 40 to 55%.

9. The process according to claim 8 wherein the $H_2O_2$ concentration after extraction is 50%.

10. The process of claim 1 in which the mother liquor depleted in $H_2O_2$ is partially purified by reducing its carbon content, and is then returned to the water stripping step.

* * * * *